United States Patent
Kondoh et al.

(10) Patent No.: US 8,103,403 B2
(45) Date of Patent: Jan. 24, 2012

(54) VEHICULAR MEMORY MANAGEMENT APPARATUS

(75) Inventors: Masayoshi Kondoh, Chiryu (JP); Yoshinori Ban, Anjo (JP); Kokichi Shimizu, Kariya (JP)

(73) Assignee: DENSO Corporation, Kariya (JP)

( * ) Notice: Subject to any disclaimer, the term of this patent is extended or adjusted under 35 U.S.C. 154(b) by 602 days.

(21) Appl. No.: 12/266,618

(22) Filed: Nov. 7, 2008

(65) Prior Publication Data

US 2009/0132117 A1 May 21, 2009

(30) Foreign Application Priority Data

Nov. 15, 2007 (JP) ................. 2007-296793

(51) Int. Cl.
*G06F 12/16* (2006.01)
*G06F 19/00* (2006.01)
(52) U.S. Cl. ........................... 701/35; 701/29
(58) Field of Classification Search ............ None
See application file for complete search history.

(56) References Cited

U.S. PATENT DOCUMENTS

| | | | |
|---|---|---|---|
| 6,327,668 B1 | 12/2001 | Williams | |
| 6,363,385 B1 | 3/2002 | Kedem et al. | |
| 6,556,901 B2 | 4/2003 | Sugimura et al. | |
| 7,031,966 B2 | 4/2006 | Kedem et al. | |
| 7,099,875 B2 | 8/2006 | Kedem et al. | |
| 7,155,704 B2 | 12/2006 | Williams | |
| 7,240,178 B2 | 7/2007 | Nakada et al. | |
| 2002/0002429 A1 | 1/2002 | Sugimura et al. | |
| 2002/0010880 A1 | 1/2002 | Williams | |
| 2002/0073090 A1 | 6/2002 | Kedem et al. | |
| 2002/0129040 A1 | 9/2002 | Frey et al. | |
| 2004/0059882 A1 | 3/2004 | Kedem et al. | |
| 2005/0036390 A1 | 2/2005 | Nakada et al. | |
| 2006/0056321 A1 | 3/2006 | Kakihara | |
| 2007/0180318 A1 | 8/2007 | Morozumi | |
| 2009/0037780 A1* | 2/2009 | Nakagaki et al. ........... 714/48 |

FOREIGN PATENT DOCUMENTS

| | | | |
|---|---|---|---|
| JP | 03-188541 | * | 8/1991 |
| JP | 09-073335 | | 3/1997 |
| JP | 10-055316 | | 2/1998 |
| JP | 10-283273 | * | 10/1998 |
| JP | 2001-067272 | | 3/2001 |
| JP | 2001-084002 | | 3/2001 |

(Continued)

OTHER PUBLICATIONS

Extended European Search Report dated Mar. 5, 2009, issued in corresponding EP Application No. 08 01 8845.1.

(Continued)

*Primary Examiner* — Michael J. Zanelli
(74) *Attorney, Agent, or Firm* — Nixon & Vanderhye P.C.

(57) ABSTRACT

When a non-volatile memory such as an EEPROM has a trouble code storage area and a status information area, status information is stored in the status information area after completion of storage of a trouble code in the trouble code storage area. Even when storage of the trouble code in a second storage area is interrupted due to a power fault with a result of three area discrepancy, the storage of the trouble code in the storage area is determined as not complete based on the status information, thereby leading to an appropriate data recovery of the trouble code in the trouble code storage area for an improvement of storage reliability of a vehicular memory management apparatus.

11 Claims, 10 Drawing Sheets

FOREIGN PATENT DOCUMENTS

| | | |
|---|---|---|
| JP | 2002-055885 | 2/2002 |
| JP | 2005-196515 | 7/2005 |
| JP | 2006-286111 | 10/2006 |

OTHER PUBLICATIONS

Extended European Search Report dated Jul. 14, 2010, issued in corresponding European Application No. 10164089.4-1233.

Japanese Office Action dated Sep. 15, 2009, issued in corresponding Japanese Application No. 2007-296793, with English translation.

Title 13, California Code Regulations, Section 1968.2, Malfunction and Diagnostic System Requirements for 2004 and Subsequent Model-Year Passenger Cars, Light-Duty Trucks, and Medium-Duty Vehicles and Engines (OBD II), pp. i-ii and pp. 1-138.

* cited by examiner

FIG. 9A
PRIOR ART

| | | |
|---:|:---:|:---|
| 1ST | 0000 0001 0001 1000 | 0x0118 |
| 2ND | 0000 0001 0001 1000 | 0x0118 |
| 3RD | 0000 0001 0001 0000 | 0x0110 |
| MAJORITY | 0000 0001 0001 1000 | 0x0118 |

FIG. 9B
PRIOR ART

| | | |
|---:|:---:|:---|
| 1ST | 0000 0001 1001 1001 | 0x0199 |
| 2ND | 0000 0000 0001 0000 | 0x0010 |
| 3RD | 0000 0011 0100 1010 | 0x034A |
| MAJORITY | 0000 0001 0001 1000 | 0x0118 |

FIG. 10A
PRIOR ART

| | | |
|---|---|---|
| 1ST | 0000 0001 0001 1000 | 0x0118 |
| 2ND | 0000 0001 0001 1000 | 0x0118 |
| 3RD | 0000 0001 0001 0000 | 0x0110 |
| MAJORITY | 0000 0001 0001 1000 | 0x0118 |

FIG. 10B
PRIOR ART

| | | |
|---|---|---|
| 1ST | 0000 0001 1001 1001 | 0x0199 |
| 2ND | 0000 0000 0001 0000 | 0x0010 |
| 3RD | 0000 0011 0100 1010 | 0x034A |
| MAJORITY | * * * * * * * * * * | 0x**** |

VEHICULAR MEMORY MANAGEMENT APPARATUS

CROSS REFERENCE TO RELATED APPLICATION

The present application is based on and claims the benefit of priority of Japanese Patent Application No. 2007-296793 filed on Nov. 15, 2007, the disclosure of which is incorporated herein by reference.

FIELD OF THE INVENTION

The present disclosure generally relates to a memory management apparatus for use in a vehicle.

BACKGROUND INFORMATION

Conventionally, an electronic control unit (i.e., an ECU in the following description) disposed in a vehicle and controlling each part of the vehicle determines whether there is a trouble in predetermined detection objects in a vehicle as required, and stores a trouble code that represents the trouble in a semiconductor memory (e.g., an SRAM, or an EEPROM) in the ECU.

Patent documents such as JP-A-2006-286111 and JP-A-2005-196515 disclose a memory management scheme using a semiconductor memory for storage of the trouble code equipped with detection functions that detect a write-error in the memory, a garbaged data in the memory, a physical error of the memory itself and the like.

When, for example, the storage of the semiconductor memory is divided into three areas, the same data is written in each of the three divided areas for detecting errors (i.e., memory error) based on a majority ruling of the data in those areas. More practically, when at least data from two areas do not agree with each other, that is, when data in three areas are respectively different, the memory is determined to have a trouble, according to the above disclosure.

When the majority ruling is performed for the data in the three memory areas in the semiconductor memory, there are two types of ruling. That is, in one case, the data is ruled by the address, that is, by a unit of bytes, or data as a whole (refer to the document JP-A-2005-196515), or in another case, the data is ruled bit by bit in the data (refer to a patent document JP-A-2001-67272).

The above cases are explained with reference to the drawing First, the majority ruling by a unit of bit is explained referring to FIGS. 9A and 9B. It is assumed that the trouble code to be memorized is 0x0118 in this case. In addition, in the data 0x0118, four digits of the latter half is a substantial part for representing a predetermined data (i.e., the trouble code) in hexadecimal. The two digits in front designate a code that indicates that the latter four digits are represented in hexadecimal. The actually stored data is the data represented by a binary code, and has a data amount of two bites. Further, the three memory areas area distinguished as the first, second and third areas in the following description.

In FIG. 9A, data "0000 0001 0001 1000" that represents 0x0118 in a binary code is memorized in the first area. The same data is stored in the second area. The data in the third area has abnormality such as a garbaged 13th bit or the like, and data "0000 0001 0001 0000" is stored.

In this case, the data at the thirteenth bit is recognized as "1" by the majority ruling using a unit of bit. In other words, by the majority ruling, the trouble code is determined as "0000 0001 0001 1000" (0x0118).

In FIG. 9B, the first area stores data "0000 0001 1001 1001" (0x0199) and, the second area stores data "0000 0000 0001 0000" (0x0010), and the third area stores data "0000 0011 0100 1010" (0x034A). In this case, when the majority ruling is applied bit by bit from the first bit of the data, the trouble code provided by the majority ruling becomes data "0000 0001 0001 1000" (0x0118). In other words, a trouble code (0x0118:"0000 0001 0001 1000") is accidentally derived from the majority ruling even when the three areas respectively store data that is different from the intended trouble code (0x0118:"0000 0001 0001 1000").

In view of the above case, the majority ruling by a unit of byte may seem to be more desirable.

The majority ruling by a unit of byte is explained with reference to FIGS. 10A and 10B. In FIG. 10A, data "0000 0001 0001 1000" that represents 0x0118 in a binary code is memorized in the first area. The second area stores the same data. The data in the third area has abnormality such as a garbaged 13th bit or the like, and data "0000 0001 0001 0000" (0x0110) is stored.

In this case, when the majority ruling is performed by a unit of byte (i.e., 2 byte data as a whole), data in the first are "0000 0001 0001 1000" (0x0118), data in the second area "0000 0001 0001 1000" (0x0118), and data in the third area "0000 0001 0001 0000" (0x0110) are used in the ruling. In this case, the majority ruling yields data "0000 0001 0001 1000" (0x0118) because the data (i.e., the trouble code) in the first and second areas agrees with each other.

In FIG. 10B, data "0000 0001 1001 1001" (0x0199) is memorized in the first area, data "0000 0000 0001 0000" (0x0010) is memorized in the second area, and data "0000 0011 0100 1010" (0x034A) is memorized in the third area.

In this case, the data in the first are "0000 0001 1001 1001" (0x0199), the data in the second area "0000 0000 0001 0000" (0x0010), and the data in the third area "0000 0011 0100 1010" (0x034A) will be used by the majority ruling by a unit of byte, and the ruling does not find majority to result in determination of the abnormality because the three areas have respectively different data.

As apparently illustrated in the comparison between FIG. 9B and FIG. 10B, the majority ruling by a unit of bit may be more prone to error in the detection of abnormality relative to the majority ruling by a unit of byte.

Further, even when the majority ruling by a unit of byte is used, another type of problem persists.

For example, due to an interruption of a power supply during a write operation in the second area, the data is not written in the second area and data in three areas may become mutually different from each other. In that case, the operation is determined as abnormality. That is, in other words, the abnormality is detected even when the semiconductor memory does not have any problem, and a chance of restoration of reliable data goes abandoned.

SUMMARY OF THE INVENTION

In view of the above and other problems, the present disclosure provides a vehicular memory management apparatus for use in a vehicle that enables confirmation whether abnormality is due to data stored in multiple memory areas of a non-volatile memory or due to an error in a storage process. The apparatus of the present invention further prevents an unnecessary loss of data restoration opportunity, thereby improving a reliability of data storage.

In an aspect of the present invention, the vehicular memory management apparatus for use in a vehicle includes: a memory management unit for evenly storing a fault code representing a fault in the vehicle in respectively different three code storage areas in a non-volatile memory disposed in the vehicle; and a status management unit for storing status information in a status storage area in the non-volatile memory. The status information represents a storage complete status of the fault code in the respectively different three code storage areas, and the status information is stored in the status storage area after completion of storage of the fault code.

Therefore, the apparatus can unambiguously determine completion of storage of the trouble code in all of the three trouble code storage areas by referring to the status information in the status information area, thereby enabling an appropriate adoption determination of the trouble code in the three trouble code storage areas based on storage completion information.

That is, for example, when storage of the trouble code in a second storage area is interrupted due to a power fault with a result of three area discrepancy of trouble code data, the storage of the trouble code in the storage area is determined as not complete based on the status information, thereby leading to an appropriate data recovery of the trouble code in the trouble code storage area for an improvement of storage reliability of a vehicle memory management apparatus.

BRIEF DESCRIPTION OF THE DRAWINGS

Other objects, features and advantages of the present invention will become more apparent from the following detailed description made with reference to the accompanying drawings, in which:

FIGS. 9A and 9B show illustrations of a majority ruling by bit used in a conventional art; and FIGS. 10A and 10B show illustrations of a majority ruling by byte used in the conventional art.

DETAILED DESCRIPTION

Figure 1:
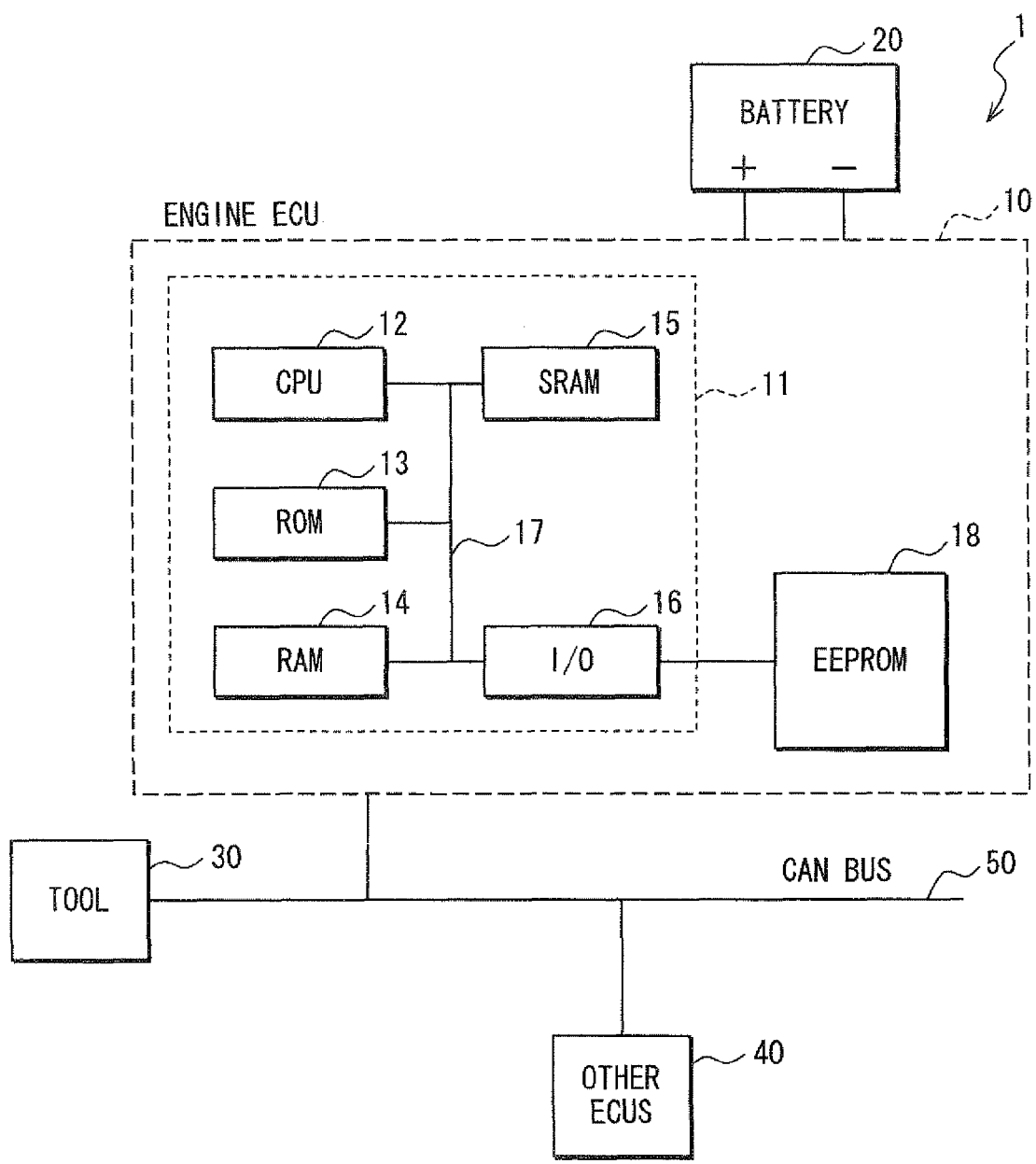
FIG. 1 shows a block diagram of a vehicle network in an embodiment of the present invention.

The embodiment of the present invention is described with reference to of the drawing as follows.

First Embodiment

FIG. 1 is a block diagram of a vehicle network 1 installed in the vehicle.

The vehicle network 1 in FIG. 1 has an electrical control unit 10 (Hereafter, it is described as ECU) to which the present invention is applied. The ECU 10 controls an engine of a vehicle. The ECU 10 is communicable with and is connected to another ECU 40 (Hereafter, it is described as another ECU) mutually by CAN (Controller Area Network) bus 50. Further, a trouble code in which breakdown detected in a vehicle is represented is read out from the ECU 10, for instance, by a repair tool 30 connected with the CAN bus 50 for a repairer to perform a repair work or the like based on the trouble code. The ECU 10 and the ECU 40 both receives the supply of the electricity from a battery of the vehicle for its operation.

The ECU 10 includes a microcomputer 11 and an EEPROM 18 made of the nonvolatile memory.

The microcomputer 11 includes following components. That is, a CPU 12 that executes various processing according to a prescribed program, a ROM 13 that stores the program executed by the CPU 12, a RAM 14 that stores an operation result derived from the CPU 12, a backup RAM 15 (Hereafter, it is described as SRAM) that can retain data while the voltage is supplied from the battery 20, an interface (I/O) 16 for connection to an external electronic device, and a bus 17 that connects the above components.

The CPU 12 operates according to the program for the fault diagnosis memorized in the ROM 13, and detects a breakdown, a fault or the like of the vehicle. Then, the trouble code (DTCP: Diagnostic Trouble Codes) in which the breakdown is shown is memorized in the SRAM 15 and the same code is stored in the EEPROM 18 as the trouble code, when the breakdown is detected. More practically, the code stored in the SRAM 15 is also memorized in the EEPROM 18 as a permanent trouble code (PDTC: Permanent Diagnostic Trouble Codes). The PDTC must be, according to a regulation in California, that is, regulations (OBDII) of California Air Resources Board (CARB), stored to the EEPROM 18 even when the battery 20 of the vehicle is removed.

Three trouble code storage areas that memorize data (i.e., the trouble code) and three status information areas that memorize status information representing whether the three trouble code storage areas have the trouble code, or more practically, whether the storage of the trouble code has completed in the EEPROM 18 as shown in FIG. 4A for instance. When one trouble code is stored, three trouble code storage areas and three status information areas are respectively used. Further, three code storage areas and three status information areas are respectively designated as a first storage/information area, a second storage/information area, and a third storage/information area, or a first area, a second area, and a third area.

Figure 2:
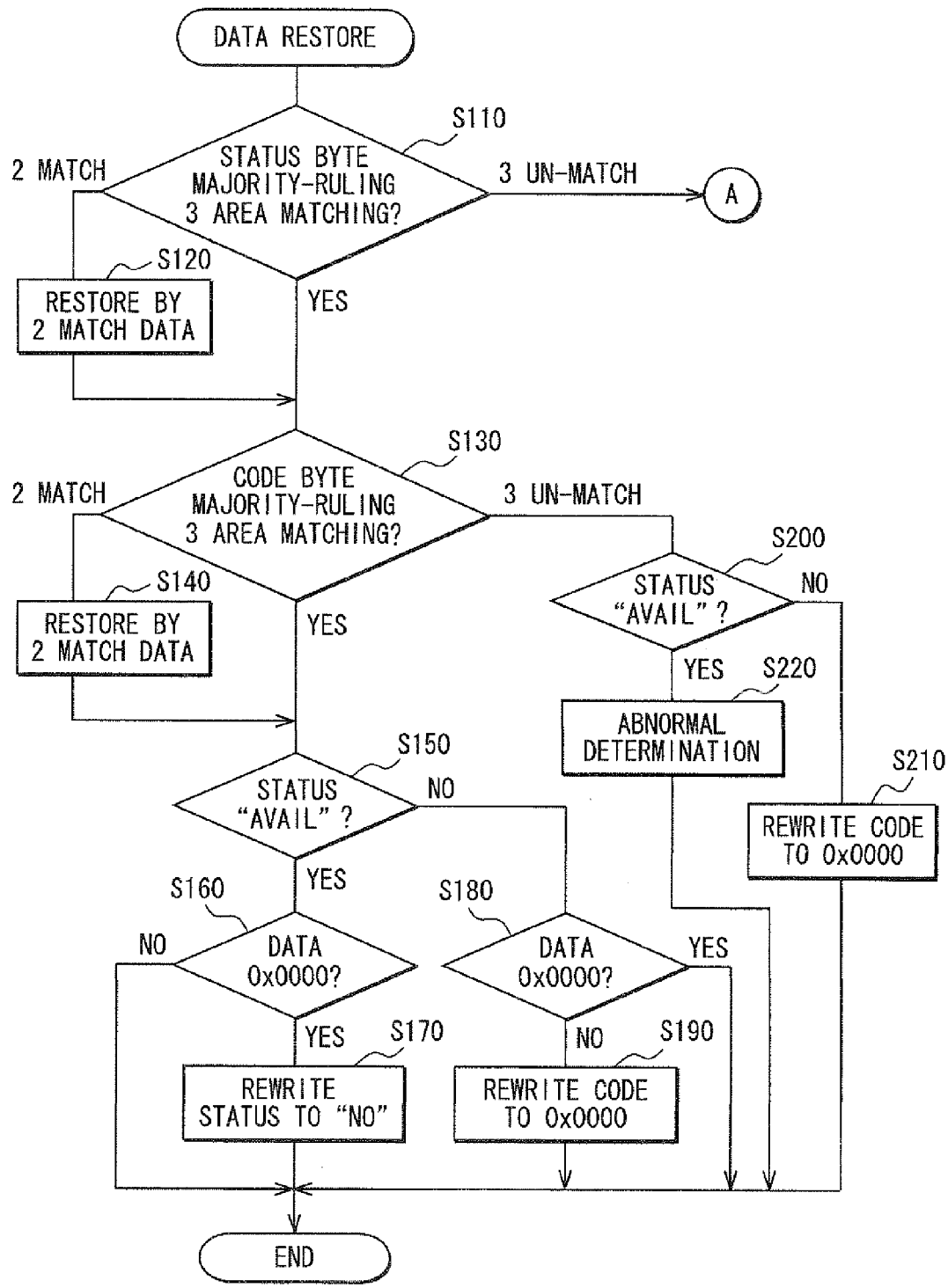
FIG. 2 shows a flow chart of data restoration processing that a CPU of a microcomputer executes.

FIG. 2 is a flow chart that shows data restoration processing that the CPU 12 of the microcomputer 11 executes. Whenever the CPU 12 starts along with the operation of the switch installed in the vehicle such as the ignition switches and the start switches for instance, this processing is executed. In the following explanations, 0x0118 is a trouble code in which a prescribed breakdown is shown, and 0x0000 is an initial value of the trouble code (initialized value).

In the processing, a majority of the status information memorized in three status information areas is first checked in S110, and it is determined whether the data of three status information areas agrees with each other on the basis of a majority ruling result (i.e., whether data in three areas matches or not).

When the data of two status information areas out of three agrees in S110 (S110:2 MATCH), the process proceeds to S120, and the data of the remainder area is restored according to the data in the two areas that agrees with each other. Then, the process proceeds to S130 afterwards.

The process proceeds to S130 from S110 when it is determined that the data of three status information areas agrees with each other (S110:YES). In S130, a majority of the stored data is checked in the three trouble code storage areas, and it is determined whether the data of tee three trouble code storage areas agrees with each other on the basis of a majority ruling result (i.e., whether data in three areas matches or not).

When the data of the two trouble code storage areas matches out of three in S130 (S130:2 MATCH), the process proceeds to S140, and the data of the remainder area is restored to the data that agrees with each other in the two areas. Then, the process proceeds to S150 afterwards.

The process proceeds to S150 when it is determined that the data of the three trouble code storage area agrees with each other in S130 (S130:YES). In S150, it is determined whether the status information is "Available" on the basis of the result of S110 or S120, and, the process proceeds to S160 when the information is "Available" (S150:YES).

In S160, the process determines whether the trouble code is 0x0000 or not on the basis of the result of S130 or S140, and the process is finished as it is when the code is not 0x0000 (S160:NO).

On the other hand, when it is determined that the trouble code is 0x0000 according to processing in S130 or S140 in S160 (S160:YES), the process proceeds to S170, and the status information in the status information area is rewritten to "NO (no information)". In other words, the status information is initialized (restored) to "NO" when the data of the three status information areas agrees with each other as "Available" and the data of the three trouble code storage areas agrees with each other as 0x0000. Then, the process is ended afterwards.

Further, when the status information is not "Available" in S150 (S150:NO), the process proceeds to S180. In S180, it is determined whether the trouble code is 0x0000 on the basis of the result of S130 or S140, and when the code is determined as 0x0000 (S180:YES), the process is ended as it is.

On the other hand, when the trouble code is not 0x0000 (S180:NO), the process proceeds to S190, and the trouble code is rewritten to 0x0000. In a word, the trouble code is initialized (restored) by determining that the status information is true (i.e., by trusting the status information) when the data of three status information areas agrees with each other having a value other than 0x0000 and the data of the three trouble code storage areas having a value other than 0x0000. That is, it can be determined that the rewriting has not completed even when the rewriting to the trouble code storage areas has actually completed due to the agreement of the data of the status information areas with each other as having the value of "NO." Therefore, the data of the trouble code storage area is restored to the initial value. The operation scheme is for coping with the following situation. That is, for instance, even when the storage of the trouble code has already competed to the second or the third area in the trouble code storage areas, the data of the trouble code storage area is restored to an initial value at once for an occasion when the power supply interception is caused before the status information is memorized in the status information area, thereby leading to the agreement of the data of the three the status information areas having the value of "NO." Then, the processing is ended afterwards.

The principle in the present embodiment is that the data of the status information areas are regarded as true (are trusted), and the data of the trouble code storage area is initialized (restored) by trusting the data of the status information area if the data of the status information area is "NO" as the processing of S190. On the other hand, the data of the status information area is rewritten to "NO" in S170 in a manner that esteems the data of the trouble code storage area in view of the three area agreement with the initial value of 0x0000 in the trouble code storage areas and the three area agreement with the value of "Available" in the status information areas. The operation scheme is for coping with the following situation. That is, even when the data (i.e., the value "Available") in the status information area is trusted, the trouble code data value of 0x0000 is actually matching with each other in the three areas, thereby leading to a non-determination, that is, what kind of data should be used other than the data 0x0000 for the restoration of the data in the trouble code storage areas. Therefore, the data of the trouble code storage area is used as an exception.

The process proceeds to S200 when the data in the three storage areas is determined to be respectively different (S130:3 UN-MATCH). Then, in S200, it is determined whether the status information is "Available" on the basis of the result of S110 or S120, and, when it is not "Available," that is, when it is "NO" (S200:NO), the process proceeds to S210 and the trouble code is rewritten to 0x0000. In a word, when the data in three storage areas disagrees with each other and the data in the three status information areas agrees with each other having the value of "NO," that is, when the storage of the trouble code in the three storage areas is determined to be not yet complete, the data in the three trouble code storage areas is initialized (restored) The operation scheme is adopted for coping with the following situation. That is, when the data of the trouble code storage areas becomes 3 area disagreement, and the status information in the status information areas is "NO," that is considered as a result of the power supply interception during the data storage to the trouble code storage areas for example. Therefore, the situation is not determined as the abnormal. Further, even when the rewrite order for the trouble code storage areas has been determined, the reliability of data in the trouble code storage areas of the nonvolatile memory is improved by restoring the data to the initial value instead of trusting the data in the first area, because the rewriting of the data has not yet completed. Then, the processing is ended afterwards.

On the other hand, the process proceeds to S220 when the status information is determined as "Available" in S200 (S200:YES), and determines the situation as abnormal. In a word, in view of the three storage area disagreement for the data in the trouble code storage areas and the three area agreement for the data of "Available" in the status information areas (if the storage of the trouble code to the three trouble code storage area can be determined as completed), the situation is determined as abnormal. The situation is then notified to a driver of the vehicle as the abnormality by lighting a warning light. Further, a code (designate as a storage abnormality code hereinafter) for representing the abnormality in the storage of the EEPROM 18 is memorized in the SRAM 15 (See FIG. 1). When the trouble code is read from the ECU 10 for instance with the tool 30 (See FIG. 1), the storage abnormality code memorized in the SRAM 15 is additionally read together with the trouble code. Then, the processing is ended afterwards.

The process proceeds to S230 (See FIG. 3) when determining that the data of three status information areas is mutually different in S110 (S110:3 UN-MATCH).

Figure 3:
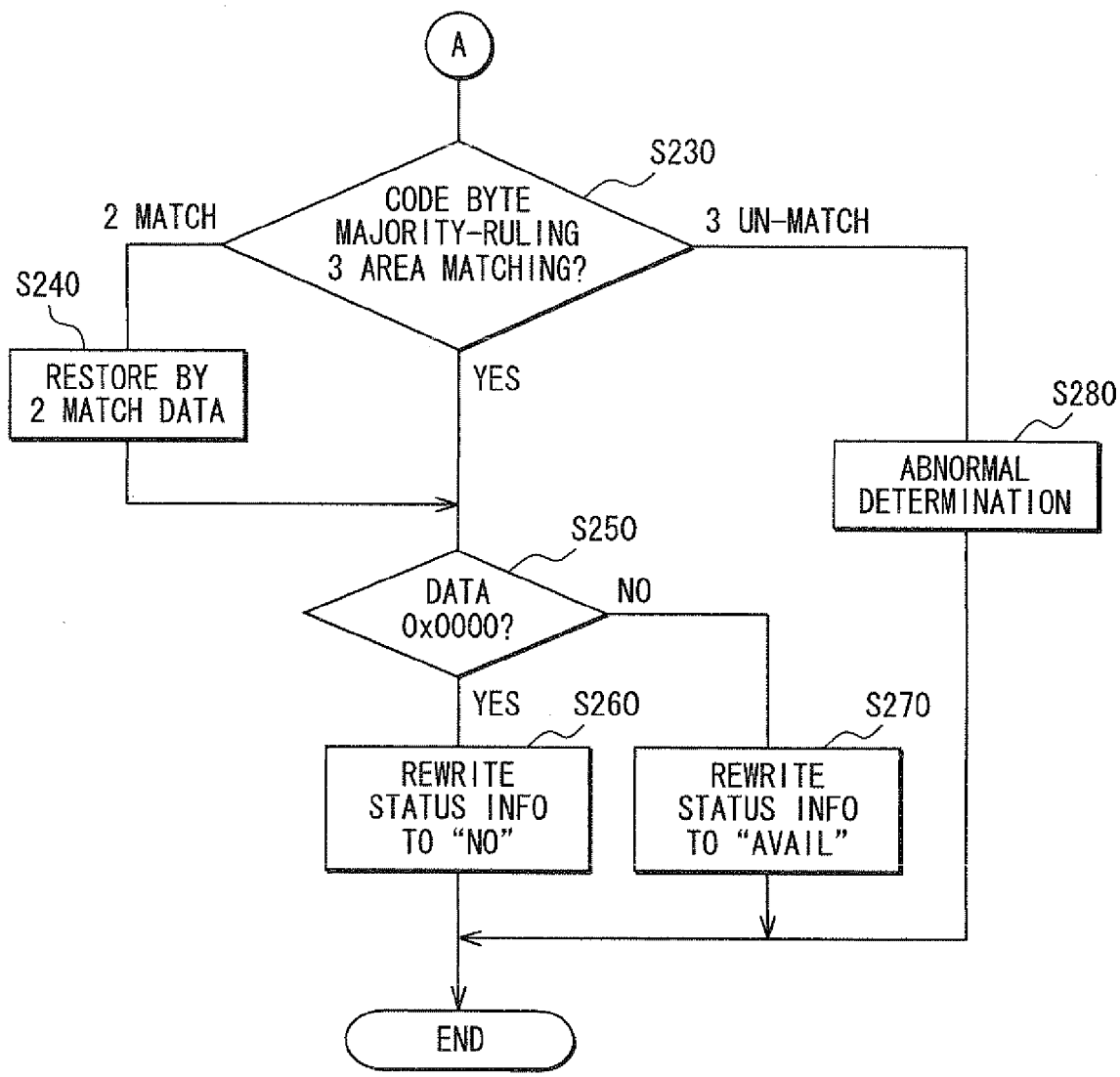
FIG. 3 shows another flow chart of the data restoration processing that the CPU of the microcomputer executes.

In FIG. 3, the process in S230 determines a majority of the data of three trouble code storage areas, and examines whether the data of the three trouble code storage areas agrees with each other on the basis of a majority ruling result (i.e., whether data in the three areas matches or not).

When the data of two trouble code storage areas out of three agrees with each other in S230 (S230:2 MATCH), the process proceeds to S240, and the data of the remainder is restored to the data in the two areas that agrees with each other. Then, the process proceeds to S250 afterwards.

When the data of three trouble code storage areas agrees with each other in S230 (S230:YES), the process proceeds to S250. In S250, it is determined whether the trouble code is 0x0000 on the basis of the result of S230 or S240, and the process proceeds to S260 when the code is 0x0000 (S250: YES), and the status information is rewritten to "NO." In a word, the status information is initialized (restored) to "NO" when three area disagreement is determined for the data in the status information areas and the three area agreement of the data having the value of 0x0000 is determined for the data in the trouble code storage areas. Then, the processing is ended afterwards.

On the other hand, when it determined that the trouble code is not 0x0000 in S250 (S250:NO), the process proceeds to S270, and the status information is rewritten to "Available." In a word, the status information is restored to "Available" when three area disagreement about the data of three status information areas and three area agreement about the data of the three trouble code storage areas with the value other than 0x0000 are confirmed. Then, the processing is ended afterwards. In S260 or S270, the above processing is performed as an exception as a similar case as S170 because of the three area disagreement in the status information areas.

The data of the three status information area thus has been restored on the basis of a majority ruling result of the data of the three trouble code storage areas the data of three status information area when the three area disagreement is observed for the status information. That is, in other words, though the primary assumption is that the status information is trusted for determining the data reliability in the trouble code storage areas, the status information may not be trusted as observed for a case of the three area disagreement due to the use of the non-volatile memory for the status information storage, or for a case of the three area disagreement due to the power supply interception during the status information rewriting after data storage in the trouble code storage areas. Therefore, the restoration of the data of the status information area is performed on the basis of the data of the trouble code storage area when the reliability of the data in the third area of the trouble code storage area is assured.

Further, the process proceeds to S280 when it is determined that the data of the three trouble code storage areas is mutually different in S230 (S230:3 UN-MATCH), and the situation is determined as abnormal. In a word, because both of the data of three status information areas and the data of the three trouble code storage areas are determined as three area disagreement, no data can be trusted thereby leading to the determination of abnormality. The abnormal determination is same as the one in S220 of FIG. 2. Then, the processing is ended afterwards.

FIGS. 4 to 7 are illustrations of the operation procedure according to the present embodiment. The data recovery is described by using the illustrations in FIGS. 4 to 7, with a focus on a data writing flow and a data initialization flow. The subject of processing is the CPU 12 of the microcomputer 11 those illustrations in FIGS. 4 to 7. The correspondence to claim language is, for example, that storage processing of the trouble code to the trouble code storage areas points to the memory management unit, and storage processing of the status information to the status information areas points to the status management unit for the illustration in FIGS. 4 to 6.

Figure 5:
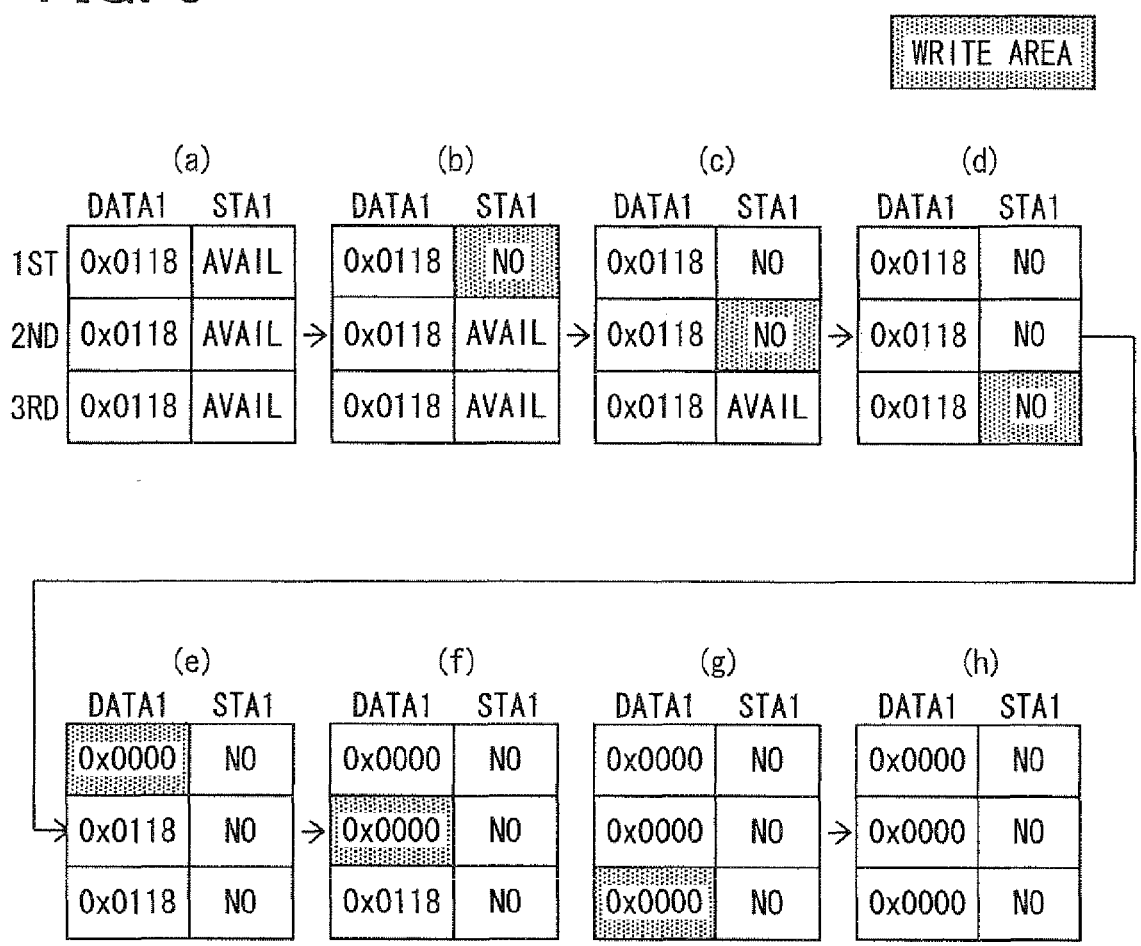
FIG. 5 shows an illustration of an initialization procedure of stored data in EEPROM.
Figure 6:
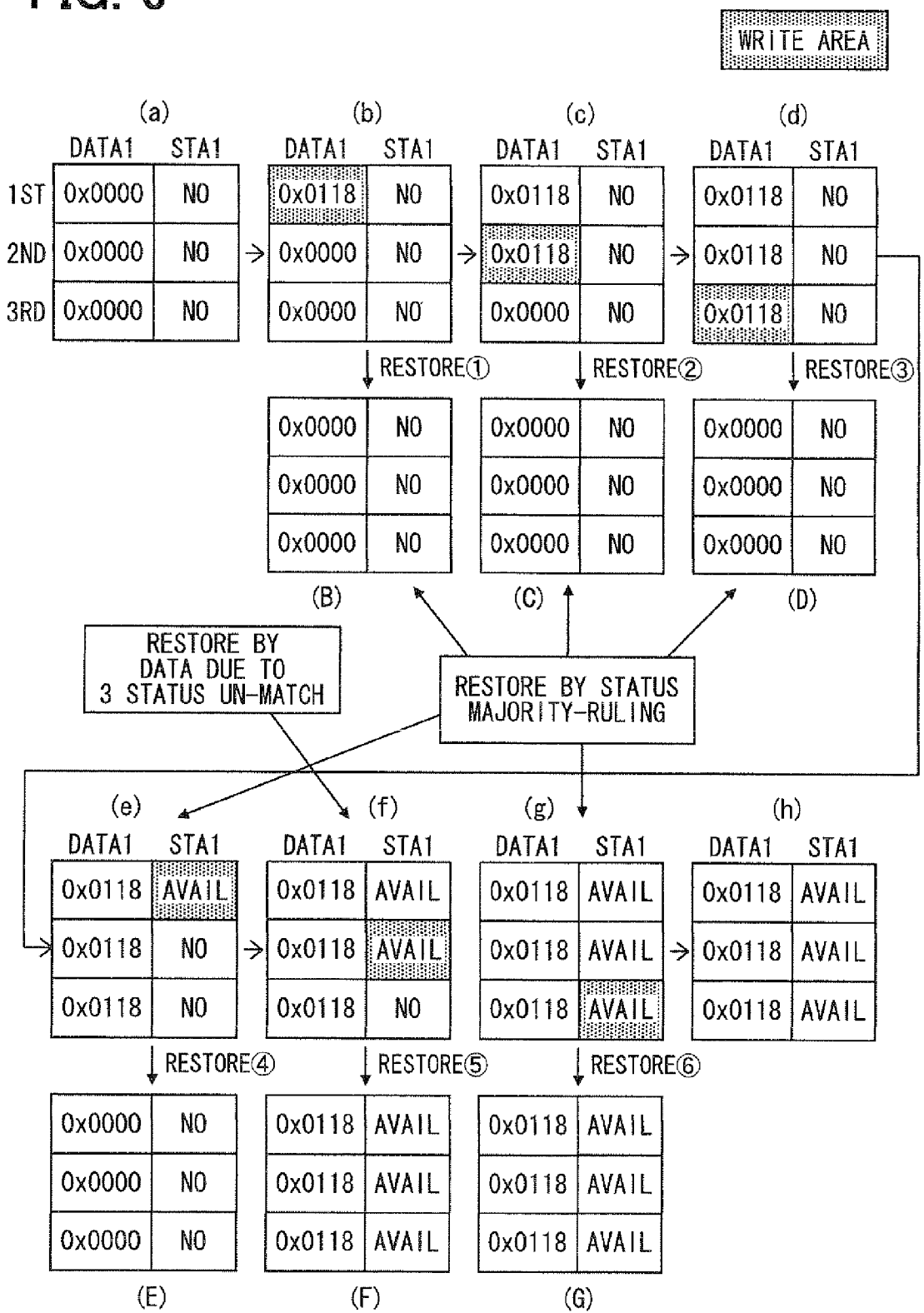
FIG. 6 shows an illustration of an operation procedure when a power supply interception occurs during data storage in the EEPROM.
Figure 7:
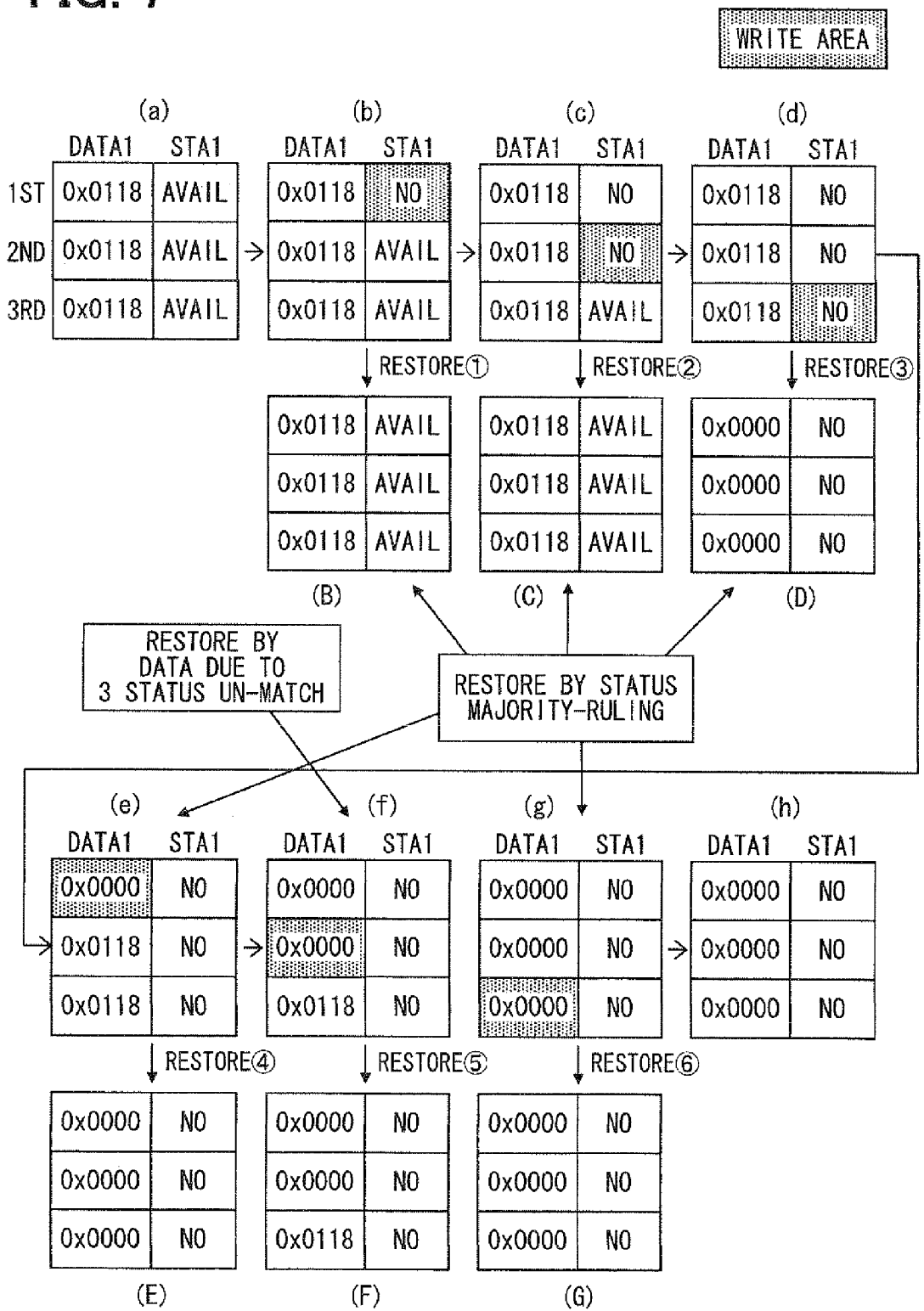
FIG. 7 shows an illustration of an operation procedure when the power supply interception occurs during data initialization in the EEPROM.

Further, initialization processing of the data of the EEPROM 18 points to the initialization control unit in the illustrations in FIGS. 5 to 7.

Figure 4:
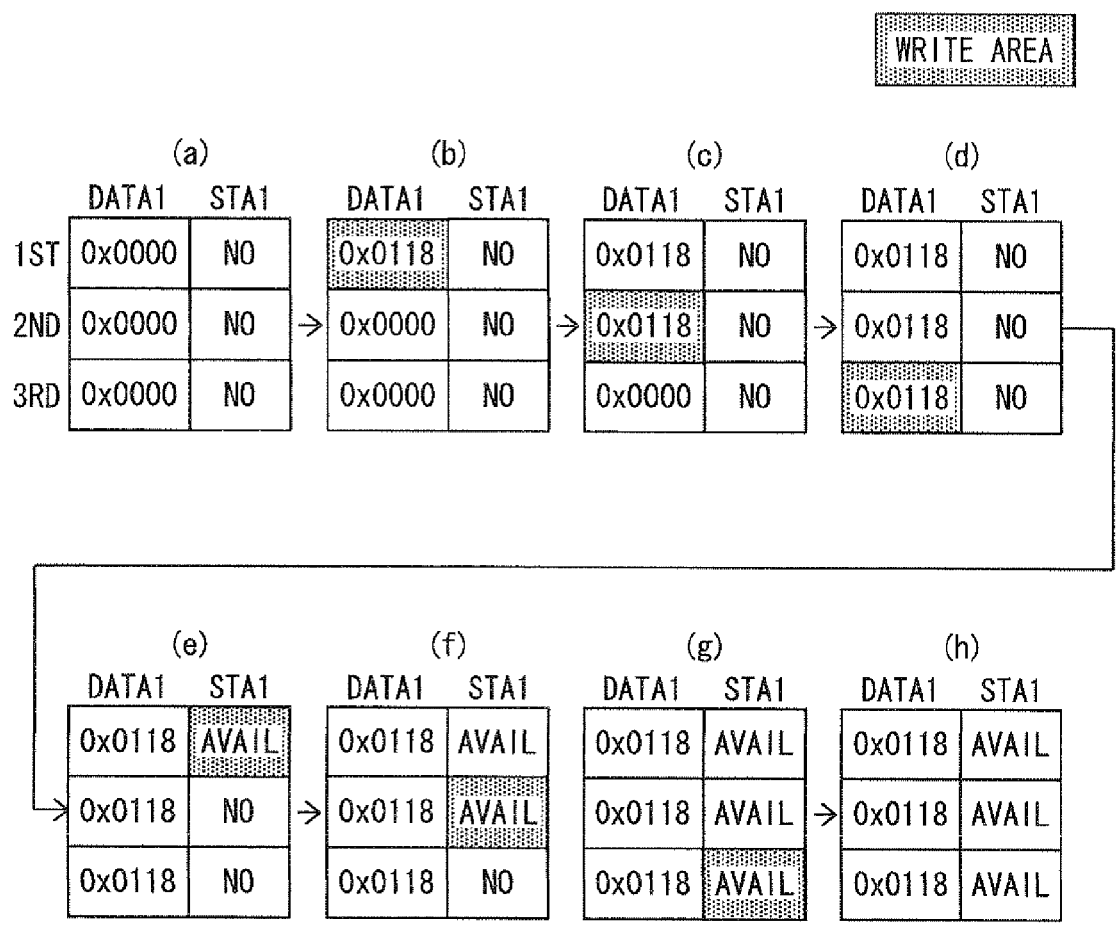
FIG. 4 shows an illustration of an operation procedure of the embodiment.

FIG. 4 is an illustration of an operation procedure regarding a writing order of the data in the EEPROM 18. The illustration explains a case where 0x0118 is memorized as data (trouble code) in the trouble code storage area of the EEPROM 18. In FIG. 4, the meshed area in the illustration represents data write area where the data (trouble code) is written.

The EEPROM 18 has the three status information areas to memorize the status information that shows whether the data writing to the trouble code storage area has completed as well as the three trouble code storage areas to memorize the trouble code as shown in a A portion of FIG. 4 mentioned above.

When, for instance, the breakdown in a prescribed detection object in the vehicle is detected and the trouble code (in the present embodiment, 0x0118) in which the breakdown is represented is memorized in the EEPROM 18 as a permanent trouble code, 0x0118 is memorized in the first trouble code storage area (i.e., the first area) as shown in a B portion of FIG. 4.

Next, 0x0118 is memorized in the second trouble code storage area (i.e., the second area) as shown in a (c) portion in FIG. 4 when the storage to the first trouble code storage area (i.e., the first area) is complete. Further, 0x0118 is memorized in the third trouble code storage area (i.e., the third area) as shown in a (d) portion in FIG. 4 when the storage to the second trouble code storage area (i.e., the second area) is complete.

When the storage of the trouble code to the first to third trouble code storage areas is complete, the status information (in the present embodiment, "Available") that shows that the trouble code is memorized in the trouble code storage areas is stored as shown in an (e) portion in FIG. 4. That is, the status information "Available" represents that the storage of the trouble code to the first to third trouble code storage areas has completed.

When the storage to the first status information area (i.e., the first area) is complete, the status information is then memorized in the second status information area (i.e., the second area) as shown in an (f) portion in FIG. 4.

Next, when the memory to the second status information area (i.e., the second area) is complete, the status information is memorized in the third the status information area (i.e., the third area) as shown in a (g) portion in FIG. 4.

The data is stored orderly in the EEPROM 18 in such an operation procedure as shown in an (h) portion in FIG. 4. The above-mentioned procedure is an example of a normal data storage case that there is no circumstance of the interception of the power supply or the like during the data memorization in the EEPROM 18.

FIG. 5 is an illustration of an initialization procedure of stored data in the EEPROM 18. In this case, the value 0x0000 is stored as the data (i.e., the trouble code) in the trouble code storage area as shown in a A portion in FIG. 5. Further, the status information (in the present embodiment, "Available") that shows completion of storage of the data to the trouble code storage area is supposed to be stored in the status information area as shown in a A portion in FIG. 5. In the example of FIG. 5, the initial value of the trouble code is 0x0000, and the initial value of the status information is "NO." Further, in FIG. 5, the meshed area represents data write area where the data is being initialized.

For instance, when the breakdown that is represented by the trouble code is diagnosed as normal for two or more trip periods (i.e., a period from turn-on to turn-off of the ignition switch of the vehicle, or a period from turn-on to subsequent turn-on), the trouble code is configured to be initialized (erased). The CPU 12 executes processing that determines whether to initialize the trouble code on the basis of the normal diagnosis for two or more trip periods, and the initialization processing corresponds to the initialization determination unit in the claim language.

When the stored data is initialized, the data in the status information area is initialized in the EEPROM 18. More practically, the stored data is initialized first in the first status information area (i.e., the first area). In this case, the data of the first status information area (the status information) becomes "NO" that serves as the initial value as shown in a B portion in FIG. 5.

Next, the data of the second status information area (i.e., the second area) is initialized as shown in a (c) portion in FIG. 5, when the initialization of the data of the first status information area (i.e., the first area) is complete. Further, the data of the third the status information area (i.e., the third area) is initialized as shown in a (d) portion in FIG. 5 when the initialization of the data of the first the status information area (i.e., the first area) is complete.

When the initialization of the data of the first to third status information areas is complete, the data of the first to third trouble code storage areas is initialized. More practically, the data of the first trouble code storage area (i.e., the first area) is initialized first. In this case, the data (i.e., the trouble code) of the first trouble code storage area is initialized to 0x0000 that serves as the initial value as shown in an (e) portion in FIG. 5.

When the initialization of the data of the first trouble code storage area (i.e., the first area) is complete, the data of the second trouble code storage area (i.e., the second area) is initialized next as shown in an (f) portion in FIG. 5. When the initialization of the data of the second trouble code storage area (i.e., the second area) is complete, the data of the third trouble code storage area (i.e., the third area) is initialized next as shown in a (g) portion in FIG. 5.

The data in EEPROM18 is initialized sequentially by such a flow as shown toward an (h) portion in FIG. 5. In addition, the above-mentioned flow is a normal case where there is no circumstance of a power supply interception or the like during the data initialization in the EEPROM18.

FIG. 6 shows an illustration of an operation procedure when a power supply interception occurs during the data storage in the EEPROM18. That is, a case that the data of 0x0118 that serves as the trouble code is stored is explained as an example. In addition, in FIG. 6, the meshed area represents the data write area where the data is being written.

First, in a B portion in FIG. 6, the power supply interception is supposed to occur during the data storage (i.e., in the middle of data storage procedure) to the first trouble code storage area (i.e., the first area). In this case, it is settled by a majority ruling among the status information stored in the first to third status information areas (S110:YES) that the status information is determined as "NO" (S150:NO). Then, based on the "NO" status information, the data in the first to third trouble code storage areas are initialized (restored) (S180:YES, or S180:NO leading to S190 as in a (B) portion in FIG. 6).

Next, in a (c) portion in FIG. 6, the power supply interception is supposed to occur during the data storage (in the middle of data storage procedure) to the second trouble code storage area (i.e., the second area). In this case, the trouble code in the second area becomes undetermined. At the same time, the trouble code in the first area is 0x0118, and the trouble code in the third area is 0x0000. In other words, the condition of the trouble codes is the three area disagreement.

In addition, it is settled by a majority ruling among the status information in the first to third status information areas (S110:YES) that the status information is determined as "NO" (S200:NO). Therefore, based on the status information having the value of "NO," the data of the first to third trouble code storage areas is initialized (restored) (S210, as in a (C) portion in FIG. 6).

Next, in a (d) portion in FIG. 6, the power supply interception is supposed to occur during the data storage (in the middle of data storage procedure) to the third trouble code storage area (i.e., the third area). In this case, it is settled by a majority ruling among the status information in the first to third status information areas (S110:YES) that the status information is determined as "NO" (S150:NO). Therefore, based on the status information having the value of "NO," the data of the first to third trouble code storage areas is initialized (restored) (S180:NO leading to S190, as in a (D) portion in FIG. 6).

In an (e) portion in FIG. 6, a case that the power supply interception occurs during (i.e., in the processing period of) the status information storage to the first status information area (i.e., the first area) after completion of data writing to the first to third trouble code storage areas is explained. In this case, the status information of "Avail" that represents that the trouble code storage to the first to third trouble code storage areas has completed is being written in the status information area.

In this case, it is settled by a majority ruling of the status information among the first to third status information areas (S110:2 MATCH leading to S120) that the status information is determined as "NO" (S150:NO). Then, based on the status information of "NO," the data in the first to third trouble code storage areas and in the first to third status information areas is initialized (i.e., restored) (S180:NO leading to S190, as in FIG. 6 (E)).

In an (f) portion in FIG. 6, a case that the power supply interception occurs during (i.e., in the processing period of) the storage of the status information having the value "Avail" to the second status information area (i.e., the second area) is explained. In this case, the status information in the second area becomes undetermined. At the same time, the status information in the first area is "Avail," and the status information in the third area is "NO." In other words, the condition of the status information is three area disagreement.

When the status information is in a condition of three area disagreement (S110:3 UN-MATCH), the trouble code in the trouble code storage area is determined as 0x0118 (S250:NO) by a majority-ruling of the trouble codes in the trouble code storage areas (S230:YES). Then, based on the determination that the value 0x0118 should be stored as the data in the trouble code storage areas, the storage of the trouble code in the trouble code storage areas is considered as complete, and the status information is restored to "Avail" (S270). In other words, 0x0118 is memorized in the first to third trouble code storage areas, and the value "Avail" is stored in the first to third status information areas as shown in an (f) portion in FIG. 6.

In a (g) portion in FIG. 6, a case that the power supply interception occurs during (i.e., in the processing period of) the storage of the status information to the third status information area (i.e., the third area) is explained. In this case, the status information in the third area is determined as "Avail" based on a majority ruling of the status information among the first to third status information areas (S110:2 MATCH). That is, the status information in at least two areas (i.e., the first and second areas) is "Avail" out of the three status information areas.

Then, based on the status information having the value "Avail," the trouble code in the first to third trouble code storage areas is determined as 0x0118 (S160:NO). The data is stored orderly in the EEPROM 18 in such an operation procedure as shown in an (h) portion in FIG. 6.

FIG. 7 shows an illustration of an operation procedure when the power supply interception occurs during data initialization in the EEPROM 18. It is assumed as an example that data having the value 0x0118 is memorized as a trouble code in the trouble code storage areas of the EEPROM18 as shown in a A portion in FIG. 7. In addition, it is assumed that the status information having the value "Avail" is stored in the status information areas for representing that the storage of the trouble code in the trouble code storage areas is complete (see the A portion in FIG. 7). In addition, in this example, the initial value of the trouble code is 0x0000, and the initial value of the status information is "NO." Further, in FIG. 7, the meshed area represents a data write area, that is, the area where the data is being written.

First, it is assumed that the power supply interception has occurred during the initialization of the data in the first status information area (i.e., the first area) in FIG. 7 in a B portion. In this case, the status information is determined as "Avail" (S150:YES) by a majority ruling of the status information among the first to third status information areas (S110:2 MATCH). Then, based on the status information having the value "Avail," the data (i.e., a trouble code) of the first to third trouble code storage areas are determined as 0x0118 (S160: NO, FIG. 7 in a (B) portion).

Then, it is assumed that the power supply interception has occurred during the initialization of the data in the second status information area (i.e., the second area) in FIG. 7 in a (c) portion. In this case, the status information in the second area becomes undetermined. At the same time, the status information in the first area is "NO" and the status information in the third area is "Avail." In other words, the condition of the status information is three area disagreement.

When the status information is in a condition of three area disagreement (S110:3 UN-MATCH), the trouble code in the trouble code storage area is determined as 0x0118 (S250:NO) by a majority-ruling of the trouble codes in the trouble code storage areas (S230:YES), and, the status information is determined as "Avail" (S270). In other words, 0x0118 is memorized in the first to third trouble code storage areas, and the value "Avail" is stored in the first to third status information areas as shown in FIG. 7 in a (C) portion.

Then, it is assumed that the power supply interception has occurred during the initialization of the data in the third status information area (i.e., the third area) in FIG. 7 in a (d) portion. In this case, the status information is determined as "NO" (S150:NO) based on a majority ruling of the status information among the first to third status information areas (S110:2 MATCH). That is, the status information in at least two areas (i.e., the first and second areas) is "NO" out of the three status information areas.

Then, based on the status information having the value "NO," the trouble code in the first to third trouble code storage areas is initialized to 0x0000 (S180:NO leading to S190, as in a (D) portion in FIG. 7).

In an (e) portion in FIG. 7, a case that the power supply interception occurs during (i.e., in the processing period of) the data initialization in the first trouble code storage area (i.e., the first area) after completion of data initialization in the first to third status information areas is explained.

In this case, the status information is determined as "NO" (S150:NO) by a majority ruling of the status information among the first to third status information areas (S110:YES). Then, based on the value "NO" of the status information, the data in the first to third trouble code storage areas is initialized (i.e., restored) (S180:NO leading to S190, as in an (e) portion in FIG. 7).

In an (f) portion in FIG. 7, a case that the power supply interception occurs during (i.e., in the processing period of) the initialization of the data in the second trouble code storage area (i.e., the second area) is explained. In this case, the trouble code in the second area becomes undetermined. At the same time, the trouble code in the first area is 0x0000, and the trouble code in the third area is 0x0118. In other words, the condition of the trouble code is three area disagreement. Further, the status information is determined as "NO" (S200:NO) based on a majority ruling of the status information among the first to third status information areas (S110:YES). Then, based on the status information having the value "NO," the trouble code in the first to third trouble code storage areas is initialized (S210:NO, as in an (f) portion in FIG. 7).

In a (g portion in FIG. 7, a case that the power supply interception occurs during (i.e., in the processing period of) the initialization of the data in the third trouble code storage area (i.e., the third area) is explained. In this case, the status information is determined as "NO" (S150:NO) by a majority ruling of the status information among the first to third status information areas (S110:YES). Then, based on the value "NO" of the status information, the data in the first to third trouble code storage areas is initialized (i.e., restored) (S180:YES, or S180:NO leading to S190, as in a (G) portion in FIG. 7).

The data of the EEPROM 18 is initialized by such a procedure toward an (h) portion in FIG. 7.

As described above, the trouble code in the trouble code storage areas is not used by a majority ruling that determines the "true" data based on the status information in the status information areas when the trouble codes are mutually different in three areas (3 UN-MATCH) due to the power supply interception during the data write to the second area. That is, it is assumed that the trouble code storage has not yet completed under the above circumstance. Therefore, the condition of three area disagreement due to the power supply interception does not necessarily lead to the conclusion of the data abnormality or physical abnormality in the trouble code storage area. That means, the data recovery is included in possible options of subsequent processing.

As a result, the chance of restoration of the data in the three trouble code storage areas is left un-abandoned, thereby leading to an improved reliability concerning the storage of the code. In addition, the reliability of the status information is improved because the status information is memorized in three areas in the present embodiment. That is, even if the data in one of the three status information areas is garbaged, the true data (i.e., the status information) is restored from the correct data in the two remaining status information areas.

Further, according to the procedure of the present embodiment, the orderly procedure of the status information data initialization in three areas followed by the trouble code data initialization in three areas creates the following advantageous effects.

That is, in a case that assumes the power supply interception during the initialization of the data in, for example, the first trouble code storage area after completion of the data initialization of the status information areas, the status information in the status information areas assures that the nonvolatile memory is in the process of initialization, which may be otherwise mis-determined as the abnormality of the first code storage area by a majority ruling with the data in the second and third areas of the trouble code storage. Therefore, the data in the three trouble code storage areas is correctly and appropriately initialized. The situation has been described as a procedure of S150 (S150:NO), S180 (S180:NO) and S190. In the procedure of S150, S180 to S190, the status of the trouble code storage to the storage areas is not only determined as not-complete, but also determined as inconsistent due to the power supply interception for example. As a result, the data can be recovered/restored and storage reliability is improved.

In the present embodiment, the ECU 10 corresponds to the vehicular memory management apparatus, the processing of S130 (with S220) and S230 (with S280) correspond to the abnormality detection unit, the processing of S200 corresponds to the adoption determination unit for instance, and the processing of S210 corresponds to the restore unit.

Second Embodiment

Figures 8A, 8B:
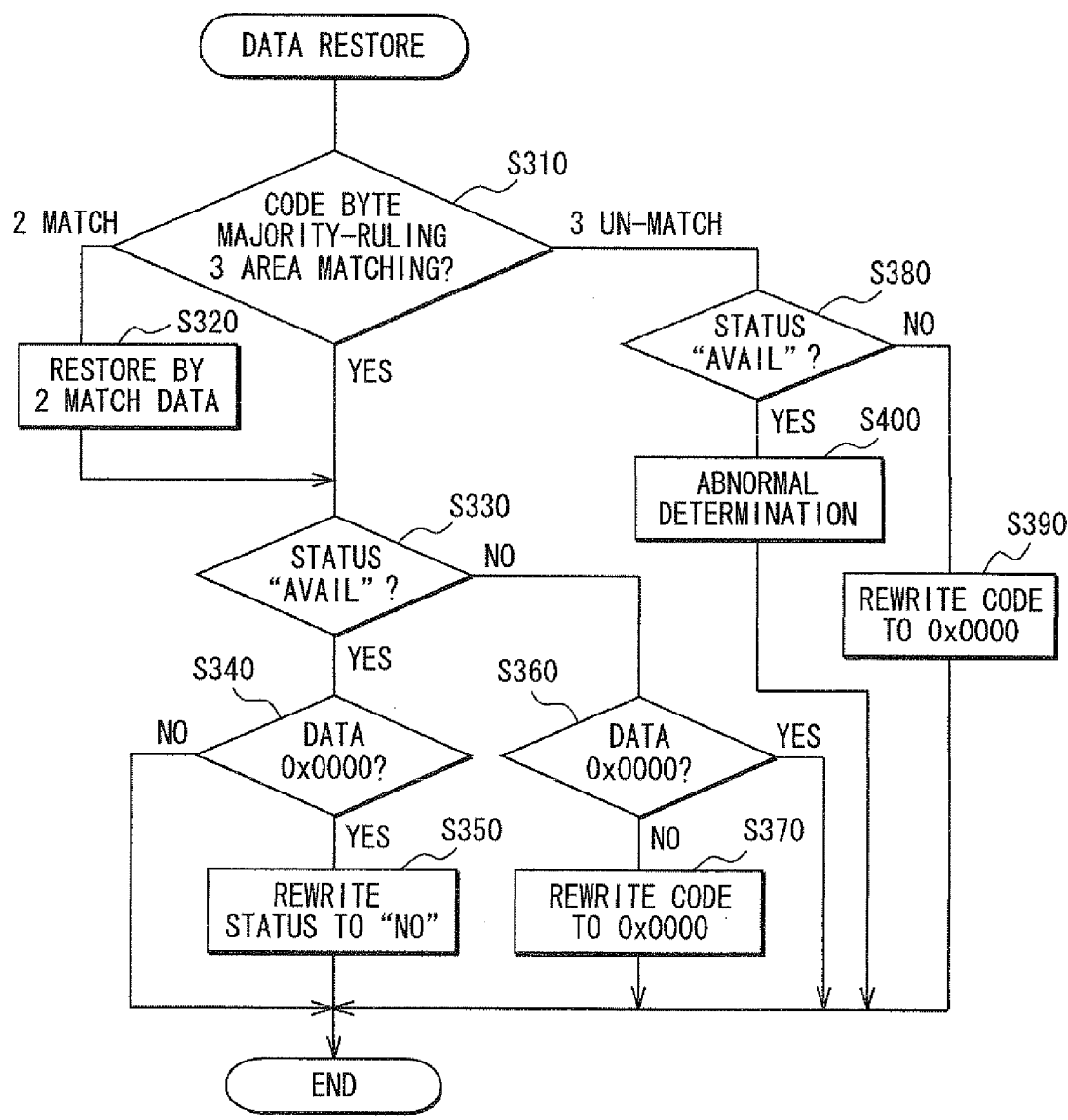
FIGS. 8A and 8B show a diagram and a flow chart of the data restoration processing that the CPU of the microcomputer executes in a second embodiment.

The second embodiment of the present invention is described in the following. As for this second embodiment, the point that only one status information area is disposed in the EEPROM 18 as shown in FIG. 8A is different from the first embodiment. In a word, only one entry of the status information is used for the storage of three trouble codes in the three trouble code storage areas.

Then, the CPU 12 of the microcomputer 11 is different and the point to execution of the data restoration processing shown in FIG. 8B is different relative to the data restoration processing shown in FIGS. 2 and 3. In the data restoration processing of FIG. 8B, the determination by the majority ruling of the trouble codes memorized in three trouble code storage areas is first performed in S310, and it is determined whether the three trouble codes agree with each other on the basis of a majority ruling result (i.e., Whether data in three areas matches or not is determined).

When two trouble codes out of three agree, the process proceeds to S320 by S310 when determined the agreement (S310:2 MATCH), and the trouble code of the remainder area is restored by using the data in two matching data that agrees with each other. Then, the process proceeds to S330 afterwards.

The process proceeds to S330 when the three trouble codes agree with each other in S310 (S310:YES). In S330, it is determined whether the status information is "Available," and, if it is "Available," the process proceeds to S340 (S330: YES).

In S340, it is determined whether the trouble code is 0x0000. Then, processing is ended without any additional step if it is determined that the trouble code is not 0x0000 (S340:NO). On the other hand, the process proceeds to S350 when it is determined that the trouble code is 0x0000 in S340 (S340:YES), and the status information is rewritten to "NO." Then, processing is ended afterwards.

Further, it is determined that the status information is not "Available," that is, the status information is "NO" (S330: NO), the process proceeds to S360. In S360, processing is ended as it is if it is determined that the trouble code is 0x0000 (S360:YES).

On the other hand, the process proceeds to S370 when it is determined in S360 that the trouble code is not 0x0000 (S360: NO), and the trouble code is rewritten to 0x0000. Then, processing is ended afterwards.

Furthermore, the process proceeds from S310 to S380 when it is determined that the three trouble codes do not agree with each other (S310:3 UN-MATCH). In S380, whether the status information is "Available" or not is determined, and, if it is not "Available," that is, if it is "NO" (S380:NO), the process proceeds to S390, and the trouble code is rewritten to 0x0000. Then, processing is ended afterwards.

On the other hand, the process proceeds to S400 when it is determined that the status information is "Available" (S380: YES), and the process determines abnormality of processing. Then, processing is ended afterwards. The advantageous effects similar to the first embodiment can be achieved according to the second embodiment, that is, the storage area of the EEPROM 18 is reduced.

In the second embodiment, processing of S310 (together with S400) corresponds to the abnormality detection unit, processing of S380 corresponds to the adoption determination unit, for instance, and processing of S390 is corresponds to the restore unit.

Although the present invention has been fully described in connection with the preferred embodiment thereof with reference to the accompanying drawings, it is to be noted that various changes and modifications will become apparent to those skilled in the art.

For example, the present invention is also applicable to an EEPROM that has two trouble code storage areas instead of three areas as shown in the above embodiment In that case, the number of the status information area may be two, or may be only one.

Further, the status information may include the trouble code to be memorized. That is, when the trouble code of 0x0118 is stored in the trouble code storage area in the above embodiment, the status information "Available" may be replaced with 0x0118 for the storage in the status information area, and the status information "NO" may be replaced with 0x0000 for the storage in the status information area.

Such changes and modifications are to be understood as being within the scope of the present invention as defined by the appended claims.

What is claimed is:

1. A vehicular memory management apparatus for use in a vehicle, wherein a fault code represents a fault in the vehicle, the apparatus comprising:

a memory management unit configured to evenly store a fault code in respectively different three code storage areas in a non-volatile memory disposed in the vehicle;

a status management unit configured to store status information in a status storage area in the non-volatile memory, the status storage area being respectively three different areas in the non-volatile memory, the status information representing a storage complete status of the fault code in the three code storage areas, and the status information being stored in the status storage area after completion of storage of the fault code; and an abnormality detection unit configured to detect storage abnormality on a basis of examination of majority of data in the three code storage areas, wherein the abnormality detection unit includes an adoption determination unit configured to determine adoption of the data in the three code storage areas after performing the examination of majority of data in the status storage area for yielding an examination result, the data in the status storage area and the three code storage areas is used for the examination of majority of data when the adoption determination unit determines adoption of the data, and the examination of majority of data yields a result that is used for determining the storage abnormality.

2. The vehicular memory management apparatus of claim 1 further comprising:
an initialization determination unit configured to determine whether the data in the non-volatile memory is initialized or not; and
an initialization control unit configured to perform initialization of the data,
wherein when the initialization of the data in the non-volatile memory is determined by the initialization determination unit, the initialization of the data in the three code storage areas is performed after the initialization of the data in the status storage areas by the initialization control unit.

3. A vehicular memory management for use in a vehicle, wherein a fault code represents a fault in the vehicle, the apparatus comprising:
a memory management unit configured to evenly store a fault code in respectively different three code storage areas in a non-volatile memory disposed in the vehicle;
a status management unit configured to store status information in a status storage area in the non-volatile memory, the status information representing a storage complete status of the fault code in the three code storage areas, and the status information being stored in the status storage area after completion of storage of the fault code,
an initialization determination unit configured to determine whether the data in the non-volatile memory is initialized or not; and
an initialization control unit configured to perform initialization of the data,
wherein when the initialization of the data in the non-volatile memory is determined by the initialization determination unit, the initialization of the data in the three code storage areas is orderly performed after the initialization of the data in the status storage area by the initialization control unit.

4. A vehicular memory management apparatus for use in a vehicle, wherein a fault code represents a fault in the vehicle, the apparatus comprising:
a memory management unit configured to evenly store a fault code in respectively different three code storage areas in a non-volatile memory disposed in the vehicle;
a status management unit configured to store status information in a status storage area in the non-volatile memory, the status information representing a storage complete status of the fault code in the three code storage areas, the status information being stored in the status storage area after completion of storage of the fault code; and
an abnormality detection unit configured to detect storage abnormality on a basis of examination of majority of data in the three code storage areas, wherein
the abnormality detection unit includes an adoption determination unit and a restore unit, the adoption determination unit being configured to determine adoption of the data in the three storage areas, and the restore unit being configured to perform initialization of the data,
the data in the three storage areas is used for the examination of majority of data when the adoption determination unit determines adoption of the data,
the examination of majority of data yields a result that is used for determining the storage abnormality, and
the data in the three code storage areas is initialized by the restore unit when the adoption determination unit does not determine the adoption of the data in the three code storage areas.

5. A vehicular memory management apparatus for use in a vehicle, wherein a fault code represents a fault in the vehicle, the apparatus comprising:
a memory management unit configured to evenly store a fault code in respectively different three code areas in a non-volatile memory disposed in the vehicle; and
a status management unit configured to store status information in a status storage area in the non-volatile memory, the status information representing a storage complete status of the fault code in the three code storage areas, and the status information being stored in the status storage area after completion of storage of the fault code,
wherein the status management unit stores data including the fault code as the status information in the status storage area.

6. A vehicular memory management apparatus for use in a vehicle, wherein a fault code represents a fault in the vehicle, the apparatus comprising:
a memory management unit configured to evenly store a fault code in respectively different three code storage areas in a non-volatile memory disposed in the vehicle; and
a status management unit configured to store status information in a status storage area in the non-volatile memory, the status information representing a storage complete status of the fault code in the three code storage areas and being stored in the status storage area after completion of storage of the fault code, the status information is provided as "available" when storage of the fault code is complete and being provided as "no" when the three code storage areas holds an initial data code indicating storage of the fault code is not complete;
a control unit configured to use a majority matching to evaluate the status information stored in the status storage area and the fault code stored in the three code storage areas in order to restore at least one of the status storage area and the three code storage areas,
wherein the control unit restores the status information stored in the status storage area to the initial status of "No" when a majority of the status information in the status storage area is provided as "available" and a majority of the three code storage areas hold the initial data code, or when a majority of the status information in the status storage area is undetermined and a majority of the three code storage areas hold the initial data code;
wherein the control unit restores the status information stored in the status storage area to "Available" when a majority of the status information in the status storage area is undetermined and a majority of the three code storage areas hold the fault code; and
wherein the control unit restores the three code storage areas to the initial data code when a majority of the status information in the status storage area is provided as "No" and a majority of the three code storage area holds the fault code, or when a majority of the status information in the status storage area is provided as "No" and a majority of the three code storage areas is undetermined.

7. A method of managing a memory for use in a vehicle, wherein a fault code represents a fault in the vehicle, the method comprising:
evenly storing a fault code in respectively different three code storage areas in a non-volatile memory disposed in the vehicle;
storing status information in a status storage area in the non-volatile memory, the status storage area being respectively three different areas in the non-volatile memory, the status information representing a storage complete status of the fault code in the three code storage areas, and the status information being stored in the status storage area after completion of storage of the fault code;

detecting storage abnormality on a basis of examination of majority of data in the three code storage areas;

determining adoption of the data in the three code storage areas after performing the examination of majority of data in the status storage area for yielding an examination result;

using the data in the status storage area and the three code storage areas for the examination of majority of data when adoption of the data is determined; and the examination of majority of data yields a result that is used for determining the storage abnormality.

8. The method of claim 7 comprising:

determining whether the data in the non-volatile memory is initialized or not; and performing initialization of the data, wherein when the initialization of the data in the non-volatile memory is determined, the initialization of the data in the three code storage areas is performed after the initialization of the data in the status storage.

9. A method of managing a memory for use in a vehicle, wherein a fault code represents a fault in the vehicle, the method comprising:

evenly storing a fault code in respectively different three code storage areas in a non-volatile memory disposed in the vehicle;

storing status information in a status storage area in the non-volatile memory, the status information representing a storage complete status of the fault code in the three code storage areas, and the status information being stored in the status storage area after completion of storage of the fault code;

determining whether the data in the non-volatile memory is initialized or not; and performing initialization of the data;

wherein when the initialization of the data in the non-volatile memory is determined, the initialization of the data in the three code storage areas is orderly performed after the initialization of the data in the status storage area.

10. A method of managing a memory for use in a vehicle, wherein a fault code represents a fault in the vehicle, the method comprising:

evenly storing a fault code in respectively different three code storage areas in a non-volatile memory disposed in the vehicle;

storing status information in a status storage area in the non-volatile memory, the status information representing a storage complete status of the fault code in the three code storage areas, the status information being stored in the status storage area after completion of storage of the fault code;

detecting storage abnormality on a basis of examination of majority of data in the three code storage areas;

determining adoption of the data in the three storage areas;

performing initialization of the data; and using the data in the three storage areas for the examination of majority of data when adoption of the data is determined, wherein the examination of majority of data yields a result that is used for determining the storage abnormality, and the data in the three code storage areas is initialized when the adoption of the data in the three code storage areas is not determined.

11. A method of managing a memory for use in a vehicle, wherein a fault code represents a fault in the vehicle, the method comprising:

evenly storing a fault code in respectively different three code storage areas in a non-volatile memory disposed in the vehicle; and storing status information in a status storage area in the non-volatile memory, the status information representing a storage complete status of the fault code in the three code storage areas, and the status information being stored in the status storage area after completion of storage of the fault code, wherein data including the fault code as the status information is stored in the status storage area.

* * * * *